Dec. 11, 1923.
J. W. McCAUSLAND
BUMPER
Filed Jan. 22, 1923
1,477,141
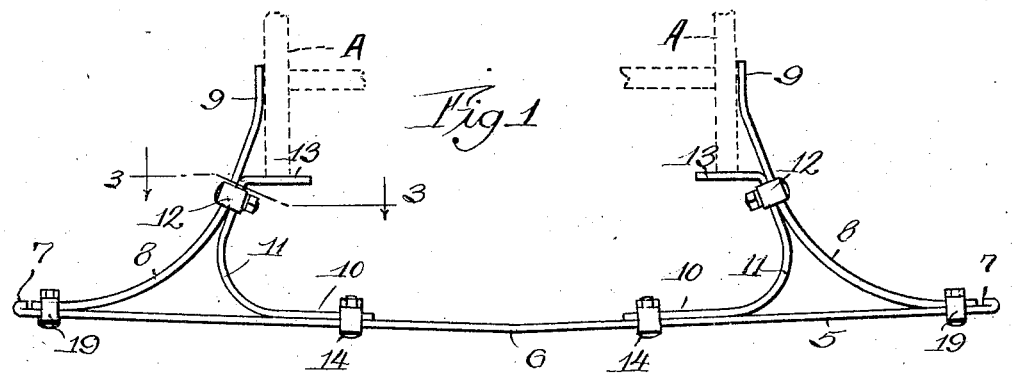
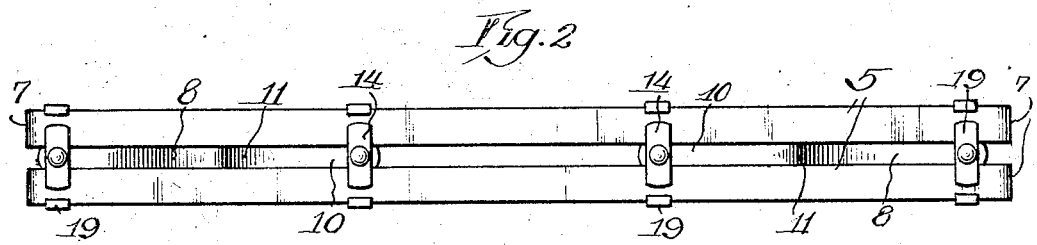
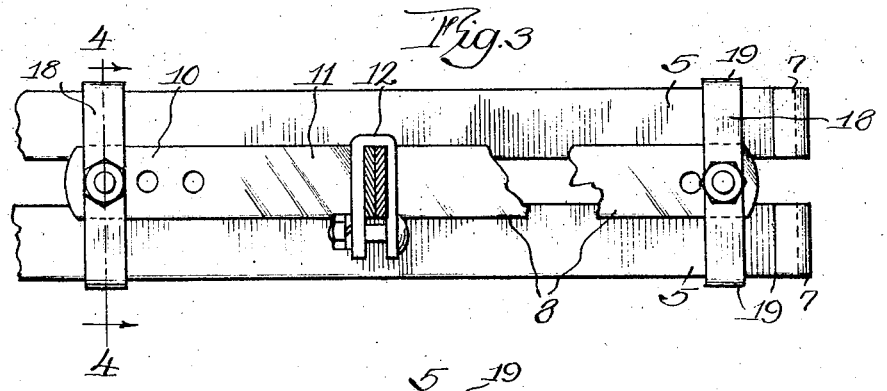
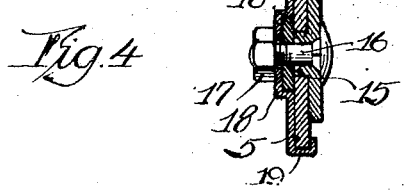
Witness:
Chas. R. Koursh
Inventor
John W. McCausland,
Benjamin, Roadhouse & Lindy, Attys.

Patented Dec. 11, 1923.

1,477,141

UNITED STATES PATENT OFFICE.

JOHN W. McCAUSLAND, OF CHICAGO, ILLINOIS, ASSIGNOR TO STAFFORD SALES COMPANY, OF CHICAGO, ILLINOIS, A CORPORATION OF ILLINOIS.

BUMPER.

Application filed January 22, 1923. Serial No. 614,064.

*To all whom it may concern:*

Be it known that I, JOHN W. McCAUSLAND, a citizen of the United States, residing at Chicago, in the county of Cook and State of Illinois, have invented a new and useful Improvement in a Bumper, of which the following is a description.

My invention relates to bumpers or fenders for motor driven vehicles, and comprises a structure formed of metal positioned upon its edge or with its flat faces in a vertical plane so as to provide a relative wide protecting area across the front of the vehicle to protect the mud guards, radiator, lamps and other accessories of the vehicle from injury, in the event of collision.

One of the objects of my invention is the provision of a bumper structure wherein a comparatively wide impact receiving element extends across the width of the vehicle, terminating adjacent the plane of the wheels, which impact element is provided with resilient attaching means in the form of lengths of strap metal so connected to the impact structure that the attaching means may be moved longitudinally thereon for the purpose of adjustment to accommodate the bumper to divers widths of vehicle frames. In this connection, another object of my invention resides in providing, besides the adjustment above alluded to, substantial means for supporting the bumper so that the attachment to the vehicle may be made at a plurality of locations upon each side of the vehicle frame whereby the principle of the cantilever is employed to hold the impact member against excessive vibration. Having the foregoing objects in view, my invention comprises the structure hereinafter more fully described and as pointed out in the claims, reference being made to the accompanying drawings that form a part of this specification.

In the drawings:

Fig. 1 is a top plan of a bumper made in accordance with my invention, and attached to the vehicle.

Fig. 2 is a vertical front elevation of the structure shown in Fig. 1.

Fig. 3 is a rear view of an end portion of the bumper, the attaching arms being in section on line 3—3, Fig. 1.

Fig. 4 is a transverse vertical section taken on line 4—4, Fig. 3.

As seen in the drawings, the impact member comprises a plurality of pieces 5, 5, of metal of either a rigid or a springy character disposed in vertically spaced alinement with each other and slightly bowed, as at 6, intermediate their ends or about the medial line of the bumper. These strips or impact bars are spaced apart in parallel relation with their edges toward each other and with their wide portions in a vertical plane,—or, in other words, upon edge. When strap metal is used the ends of each strip are bent back and pressed against the body portion, as at 7, to thicken the bars which provides a finish at the ends of the impact member, and the impact members 5 are maintained in separated relation by means of suitable spacers as will hereinafter more fully appear.

The structure for mounting the impact bars upon the ends of the vehicle comprises arms extending laterally away from the bars and movable toward and away from the ends of the impact structure so that the bumper may be readily adjusted to fit vehicles of divers widths. Said arms are formed of strap metal of substantially the same gage as the impact members for convenience in fabrication, and the outer elements thereof comprise pieces that are bent in wide curves 8 extending inwardly from the outer ends of the impact bars. These curved portions 8 engage impact bars 5 at the rear faces of the latter and overlap the spaced longitudinal edges of said bars, as seen in Figs. 3 and 4. The opposite end portions of these arms extend to the vehicle and have slightly bent portions 9 that are disposed obliquely or tangentially to the main portion of arms 8 and are connected in any suitable manner to the adjacent portions of the vehicle frame A preferably at points removed from the ends thereof. Arranged alongside the arms just described are supplementary arms or members which comprise straight portions 10 of strap metal that lie flat against the rear of impact members 5 in a manner similar to the other arms and extend toward said arms 8, in short, substantially semi-circular curves 11 to contact the other arms to which they are secured by means of the clips 12. Beyond the clips the supplementary arms are bent laterally to their body portions so as to extend toward each other in straight portions 13, to the ends of which are secured suitable means for mounting these supplementary arms on the vehicle frame A at points at a distance from the points of attachment of pieces 9 forwardly or intermediately thereof.

The means for securing portions 8 and 10 of the bumper attaching arms to the impact member 5 and for spacing said impact bars in their desired relation comprises the structure shown in Fig. 4, which, it will be seen, consists of a flat plate 14 having an embossment 15 upon its rear face that is positioned between bars 5 of the impact member and thereby spaces them the desired distance; plate 14 being positioned on the front surfaces of said impact pieces 5. An aperture is made in the plate and the embossment to receive a headed bolt 16 that is passed therethrough and through an opening or aperture made in the adjacent portion of the respective arms 8 and 10, as the case may be, while a nut 17 and retaining plate 18 are placed upon the threaded portion of bolt 16 and screwed into position. This will clamp the adjacent overlying portions of the arms to impact bars 5 and will space said impact bars and hold them in such relation. It will be seen the attaching members are of a V or Y shape with outwardly flared arms of the V or Y, the end portions of which lie flat against the back surfaces of the impact bars, while the clamps act as spacers for the impact bars, so that the attaching members may be slid along the impact member to accommodate the structure to divers widths of vehicles. It will be understood clips 12 may be loosened when desired and the relation of the V-shaped arms to each other may be thereafter changed whenever special disposition of the structure is desired.

When the bumper is to be mounted upon a vehicle the width of the vehicle frame is ascertained and the attaching members may be adjusted to such width by loosening nuts 17 of these clamping members whereupon portions 8 and 10 may be bodily slid or moved in the space between impact bars 5 and then locked in desired position; also clips 12 may be loosened, if desired, and the relation of the adjacent portions of the attaching arms upon their side of the bumper may also be altered.

The retaining plate 18 above mentioned is preferably a strip of thin metal or a casting that is shaped to conform to the contour of the portions of the bumper back of spacer plates 14 and has its ends provided with L-shaped extensions 19 that pass over the top and bottom edges and extend transversely upon the front face of the impact member, as seen in Fig. 4 of the drawings, so as to prevent any lateral separation of bars 5.

When a bumper of the above construction and made with spring impact bars receives a blow or is struck intermediate the supporting members, the impact structure will bow inwardly toward the vehicle causing a straightening of curve 8 of the supporting arms, and at the same time there will be a slight slippage or relative movement between portion 10 and the adjacent portion of the impact member because these parts are frictionally clamped together.

It will be appreciated that in lieu of the spring strap metal impact bars I may employ rigid bars which of course would be very desirable in the event that flexibility was required only in the attaching or supporting members or arms. In such case a blow on the impact bar or bars would move it or them toward the vehicle and would tend to spread the ends of the yieldable arms nearest the impact member with the result that there would be a slight slippage or relative movement between these elements at their points of connection at plate 14.

What I claim is:

1. A bumper comprising an impact member formed of a horizontal bar, and means for attaching the end portions of the same to a vehicle consisting each of spring bars clipped together intermediate their ends; the portions of said attaching bars adjacent the impact member being curved in opposite directions and secured to said member, the other ends of said attaching bars extending to the vehicle and secured thereto at points spaced from each other.

2. A bumper comprising an impact member formed of a plurality of vertically spaced bars extending across the front of a vehicle, and means for attaching the end portions of said bars to a vehicle consisting each of spring bars clipped together intermediate their ends, the portions of said attaching bars between the clips and the impact member being curved in opposite directions and overlying the spaced edges of the respective impact bars and secured thereto, the other ends of said attaching bars extending to the vehicle and secured thereto at points spaced from each other.

3. A bumper comprising a plurality of vertically spaced spring impact bars, spring attaching bars connected to the ends of said impact bars and curved inwardly and rearwardly therefrom to the vehicle on which the bumper is mounted, separate spring attaching bars connected at their outer ends to the impact bars intermediate the ends of the latter and bent in an outward curve to the first attaching bars and then continued inwardly toward each other for attachment to the vehicle in front of the ends of the first attaching bars, clips connecting adjacent portions of said first and second attaching bars, and means connecting the outer portions of said attaching bars to the impact bars whereby the former may be moved longitudinally upon the impact bars to vary the distance between the attaching members at the opposite ends of the bumper.

4. A bumper comprising an impact member formed of a plurality of vertically spaced horizontal bars, and means for attaching the ends of the impact member to a vehicle each consisting of spring bars clipped together intermediate their ends, the outer portions of said attaching bars being curved away from each other so that their ends engage flat against the impact bars, and clamping devices extending between the spaced impact bars for slidably maintaining the contact parts in assembly, whereby a blow upon the impact member will cause a relative movement between the latter and one of said attaching bars.

5. A bumper comprising a pair of vertically spaced spring bars forming an impact member, means for attaching the ends of said member to a vehicle each consisting of oppositely bent spring bars connected to each other intermediate their ends, and clamping devices a portion of which extends between said impact bars for adjustably connecting said attaching bars thereto whereby a blow upon the impact member will cause a relative movement between the latter and one of said attaching bars.

Signed at Chicago, county of Cook and State of Illinois, this tenth day of January, 1923.

JOHN W. McCAUSLAND.